(12) United States Patent
Brugler et al.

(10) Patent No.: US 8,271,876 B2
(45) Date of Patent: Sep. 18, 2012

(54) TRIGGER, GENERATE, AND DISPLAY HOVER HELPS FOR MULTIPLE USER INTERFACE ELEMENTS

(75) Inventors: Thomas Stanton Brugler, Fuquay-Varina, NC (US); Todd Michael Eischcid, Cary, NC (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 12/360,042

(22) Filed: Jan. 26, 2009

(65) Prior Publication Data

US 2010/0192097 A1 Jul. 29, 2010

(51) Int. Cl.
*G06F 3/00* (2006.01)
(52) U.S. Cl. .................................................... 715/708
(58) Field of Classification Search .................. 715/821, 715/764, 513, 705, 810–811, 708
See application file for complete search history.

(56) References Cited

U.S. PATENT DOCUMENTS

| | | | |
|---|---|---|---|
| 5,963,950 A * | 10/1999 | Nielsen et al. | 1/1 |
| 6,222,541 B1 | 4/2001 | Bates et al. | 345/341 |
| 6,470,383 B1 | 10/2002 | Leshem | 709/223 |
| 6,819,336 B1 * | 11/2004 | Nielsen | 715/711 |
| 7,051,282 B2 * | 5/2006 | Marcjan | 715/743 |
| 8,065,051 B2 * | 11/2011 | Chopcinski et al. | 701/36 |
| 2002/0015056 A1 * | 2/2002 | Weinlaender | 345/705 |
| 2002/0175955 A1 * | 11/2002 | Gourdol et al. | 345/821 |
| 2005/0125744 A1 * | 6/2005 | Hubbard et al. | 715/824 |
| 2006/0184880 A1 * | 8/2006 | Bala | 715/705 |
| 2007/0283292 A1 * | 12/2007 | Bucher et al. | 715/810 |
| 2008/0059961 A1 * | 3/2008 | Miranda-Steiner et al. | 717/171 |

* cited by examiner

*Primary Examiner* — Doon Chow
*Assistant Examiner* — Wilson Varga
(74) *Attorney, Agent, or Firm* — Zilka-Kotab, PC

(57) ABSTRACT

In one embodiment, a method comprises receiving user input requesting display of pieces of information associated with user interface elements displayed on a page; analyzing the page for determining the pieces of information associated with the user interface elements; and outputting some of the pieces of information associated with a plurality of the user interface elements for concurrent display on the page with each other and with the user interface elements. Additional systems, methods, and computer program products are also presented.

7 Claims, 8 Drawing Sheets

TRIGGER, GENERATE, AND DISPLAY HOVER HELPS FOR MULTIPLE USER INTERFACE ELEMENTS

BACKGROUND

The present invention relates to user interface elements, and more particularly, this invention relates to methods for showing such elements.

When users work with web sites, operating systems, word processing applications, or any other application, it may be difficult to determine which items, icons, words, etc., displayed on the screen have functionality associated with clicking the item (clickable), icon, word, etc. Many of these items have tags associated with them that offer "hover help" or other tags like "submit" buttons. However, the user must first know that the item is clickable so that the user can hover over the item to bring up the help or other additional functionality. Therefore, it would be beneficial to users to be able to easily determine all of the items at once which may have additional functionality associated with clicking the item.

SUMMARY

In one embodiment, a method comprises receiving user input requesting display of information associated with user interface elements displayed on a page; analyzing the page for determining the information associated with the user interface elements; and outputting the information associated with a plurality of the user interface elements for concurrent display on the page with each other and with the user interface elements.

In another embodiment, a computer program product for outputting information associated with a plurality of user interface elements comprises: a computer usable medium having computer usable program code embodied therewith, the computer usable program code comprising: computer usable program code configured to receive user input requesting display of information associated with user interface elements displayed on a page; computer usable program code configured to analyze the page for determining the information associated with the user interface elements; and computer usable program code configured to output the information associated with a plurality of the user interface elements for concurrent display on the page with each other and with the user interface elements.

In another embodiment, a method comprises: receiving user input requesting emphasis of user interface elements displayed on a page; analyzing the page for determining the user interface elements; and visually emphasizing at least some of the user interface elements displayed on the page.

In another embodiment, a computer program product for outputting information associated with a plurality of user interface elements comprises: a computer usable medium having computer usable program code embodied therewith, the computer usable program code comprising: computer usable program code configured to receive user input requesting emphasis of user interface elements displayed on a page; computer usable program code configured to analyze the page for determining the user interface elements; and computer usable program code configured to visually emphasize at least some of the user interface elements displayed on the page.

Other aspects and embodiments of the present invention will become apparent from the following detailed description, which, when taken in conjunction with the drawings, illustrate by way of example the principles of the invention.

DETAILED DESCRIPTION

Figure 1:
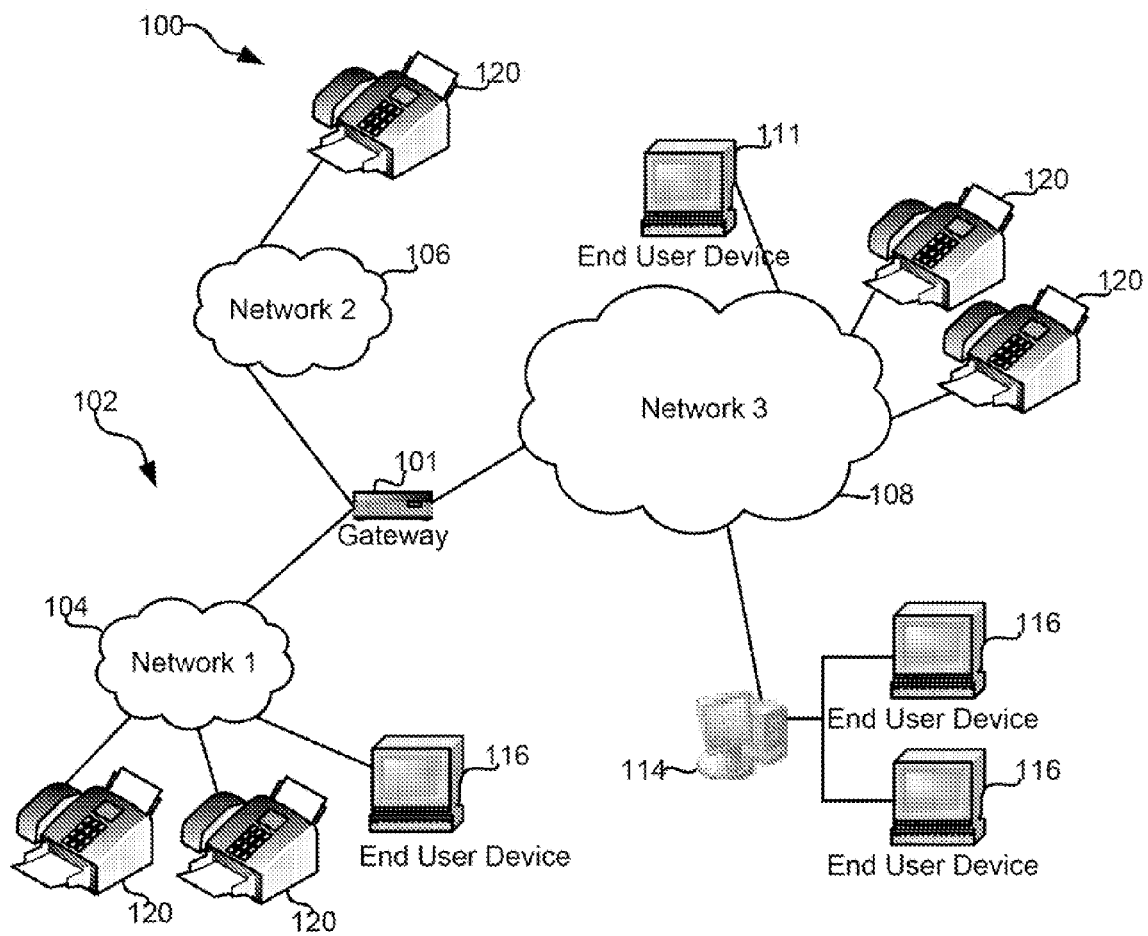
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of methods for showing, identifying, and/or explaining user interface elements in an application such as a web application. For example, such elements may be somehow made to stand out or otherwise made more clear and available, so that the user can more easily and quickly perceive the user interface elements in the application.

In one general embodiment, a method comprises receiving user input requesting display of information associated with user interface elements displayed on a page; analyzing the page for determining the information associated with the user interface elements; and outputting the information associated with a plurality of the user interface elements for concurrent display on the page with each other and with the user interface elements.

In another general embodiment, a computer program product for outputting information associated with a plurality of user interface elements comprises: a computer usable medium having computer usable program code embodied therewith, the computer usable program code comprising: computer usable program code configured to receive user input requesting display of information associated with user interface elements displayed on a page; computer usable program code configured to analyze the page for determining the information associated with the user interface elements; and computer usable program code configured to output the information associated with a plurality of the user interface elements for concurrent display on the page with each other and with the user interface elements.

In another general embodiment, a method comprises: receiving user input requesting emphasis of user interface elements displayed on a page; analyzing the page for determining the user interface elements; and visually emphasizing at least some of the user interface elements displayed on the page.

In another general embodiment, a computer program product for outputting information associated with a plurality of user interface elements comprises: a computer usable medium having computer usable program code embodied therewith, the computer usable program code comprising: computer usable program code configured to receive user input requesting emphasis of user interface elements displayed on a page; computer usable program code configured to analyze the page for determining the user interface elements; and computer usable program code configured to visually emphasize at least some of the user interface elements displayed on the page.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A facsimile machine 120 or series of facsimile machines 120 may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
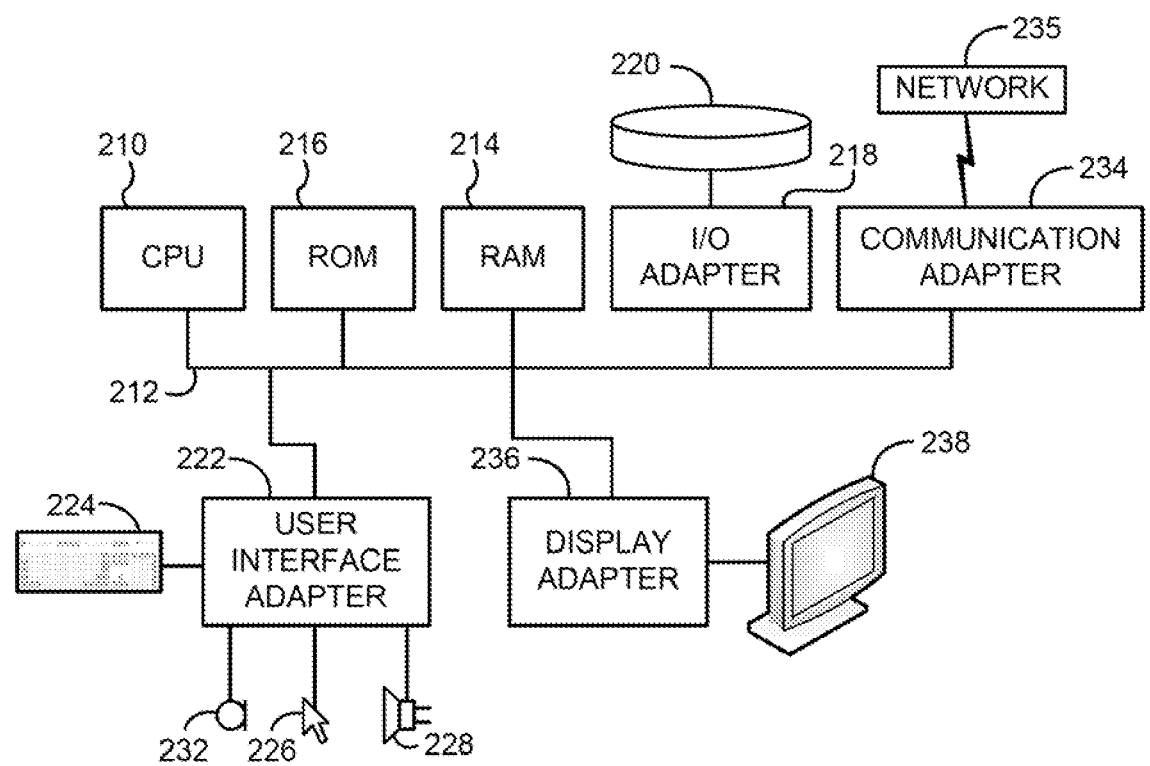
FIG. 2 shows a representative hardware environment that may be associated with the servers and/or clients of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 210 such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3A:
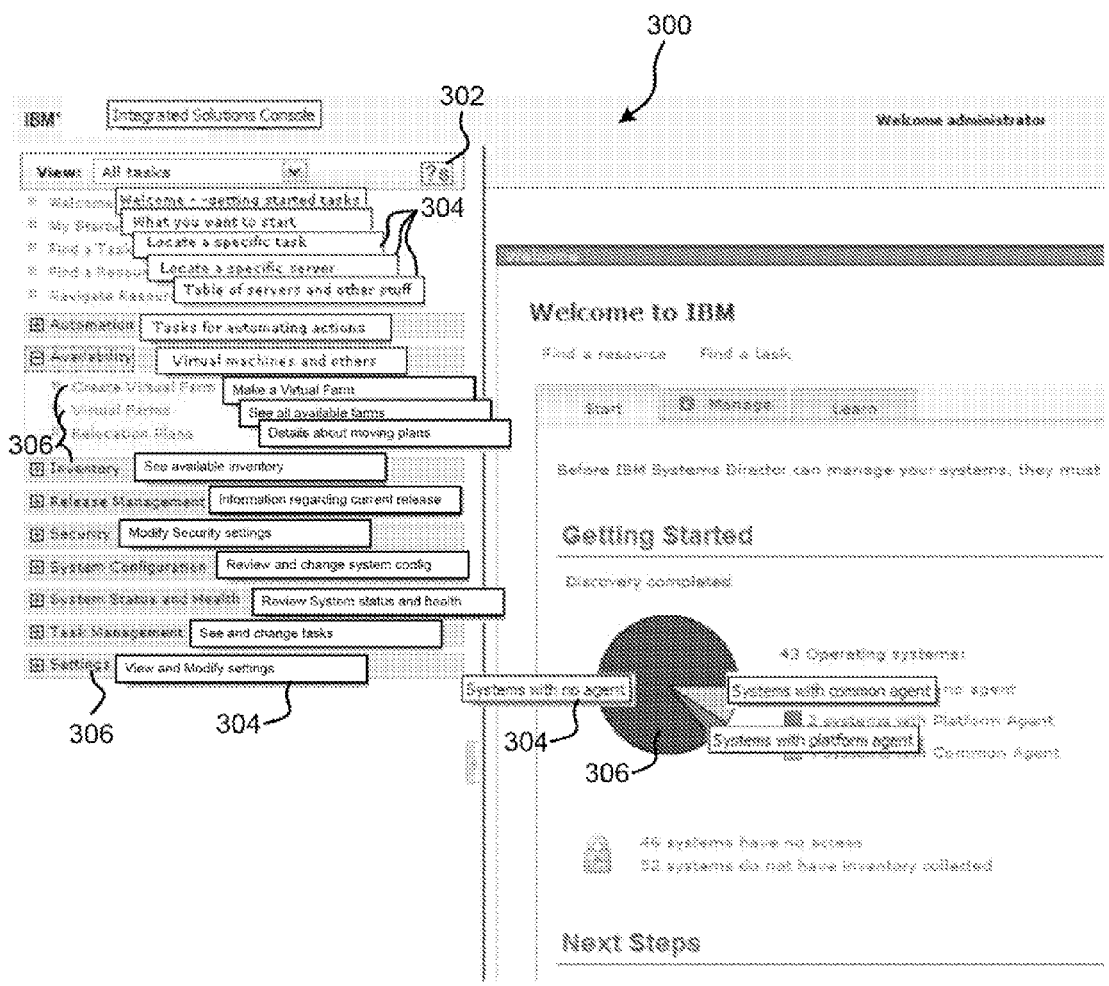
FIG. 3A shows a portion of a user interface including hover helps according to one embodiment.

With reference to FIG. 3A, a method may be described according to one embodiment, which may also be included in a computer program product, according to some additional embodiments.

Some embodiments allow a user to click a control 302 on a user interface (UI) 300 to show all, some, or one of the hover helps 304 available for the items 306 on the screen, or may allow the user to use a mouse combination to show the available hover helps 304. A mouse combination may include one or more keystroke(s) and mouse clicks of one or more buttons. When the user performs the initiation action, the UI 300 can display the available hover helps 304 for the items on the screen, in a given application, in an open window, etc. Clicking one of the hover helps 304 in the displayed hover helps 304 could be an event that emphasizes and indicates the item in the UI 300. The available hover helps 304 may be displayed in a list, a window, as a group of icons, as thumbnails, as cascading tiles, a dropdown menu, etc.

Figure 3B:
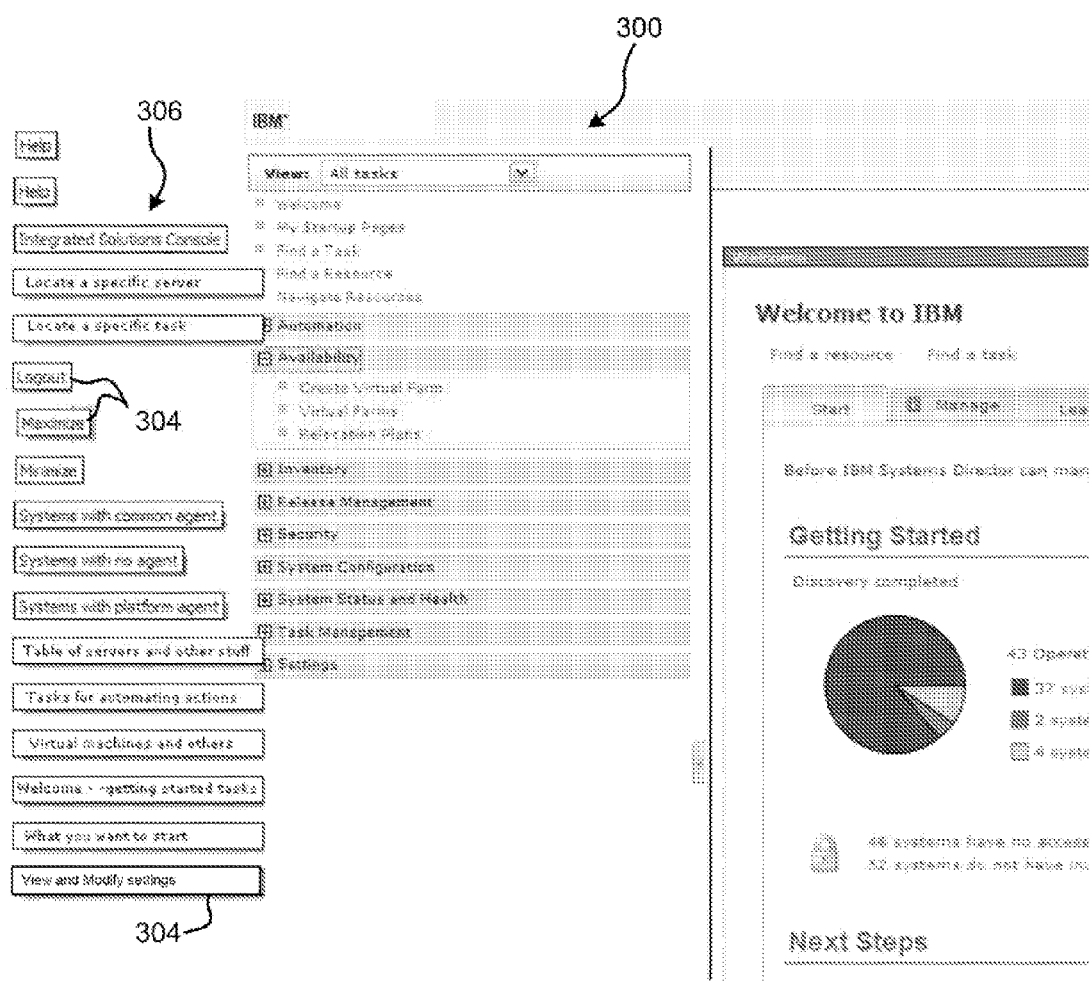
FIG. 3B shows a portion of a user interface including hover helps oriented in a list according to one embodiment.

For example, in FIG. 3B, the hover helps 304 are shown in a list 306 according to one embodiment.

In a further embodiment, the system may allow the user to perform a fly-over instead of a click. Since the user might be more apt to understand the more fully developed and helpfully detailed fly-over, the system may allow the user to select the "help" directly to invoke the action. In this case, flying over the help could be the event that connects the fly-over to the base node in the UI 300.

In another embodiment, the system may allow the user to initiate some action, such as clicking a button, depressing a key, talking a voice command, etc., and the view may change in response to this action to emphasize only the items linked, such as with HTML, Java, etc., and/or items that are clickable. When the user initiates some action, the non-clickable parts of the UI 300 may also be simultaneously deemphasized (shown with a translucent darkened color such as a blue-grey overlay; blacked out; greyed out; faded out; become fuzzy, etc.). In another embodiment, the user interface may remain unchanged (e.g., no added de-emphasis) and the items which are clickable may be emphasized more than the non-clickable items, perhaps by showing the clickable items more pronounced, such as by highlighting them, changing the color, applying a brightened color such as yellow, orange, red, etc.

In yet another embodiment, user preference may be used to determine the level of emphasis for the clickable items. For example, the items that the user has most clicked in the past may be emphasized the most. In addition, little used but important items may be highlighted or emphasized differently than the rest of the items. Presumably, this embodiment will be useful to the user, as the most clicked items are probably the most relevant to the user.

In another embodiment, the clickable items used least by the user in the past may be deemphasized. In addition, little used but important items may be highlighted or emphasized differently than the rest of the items.

Figure 4:
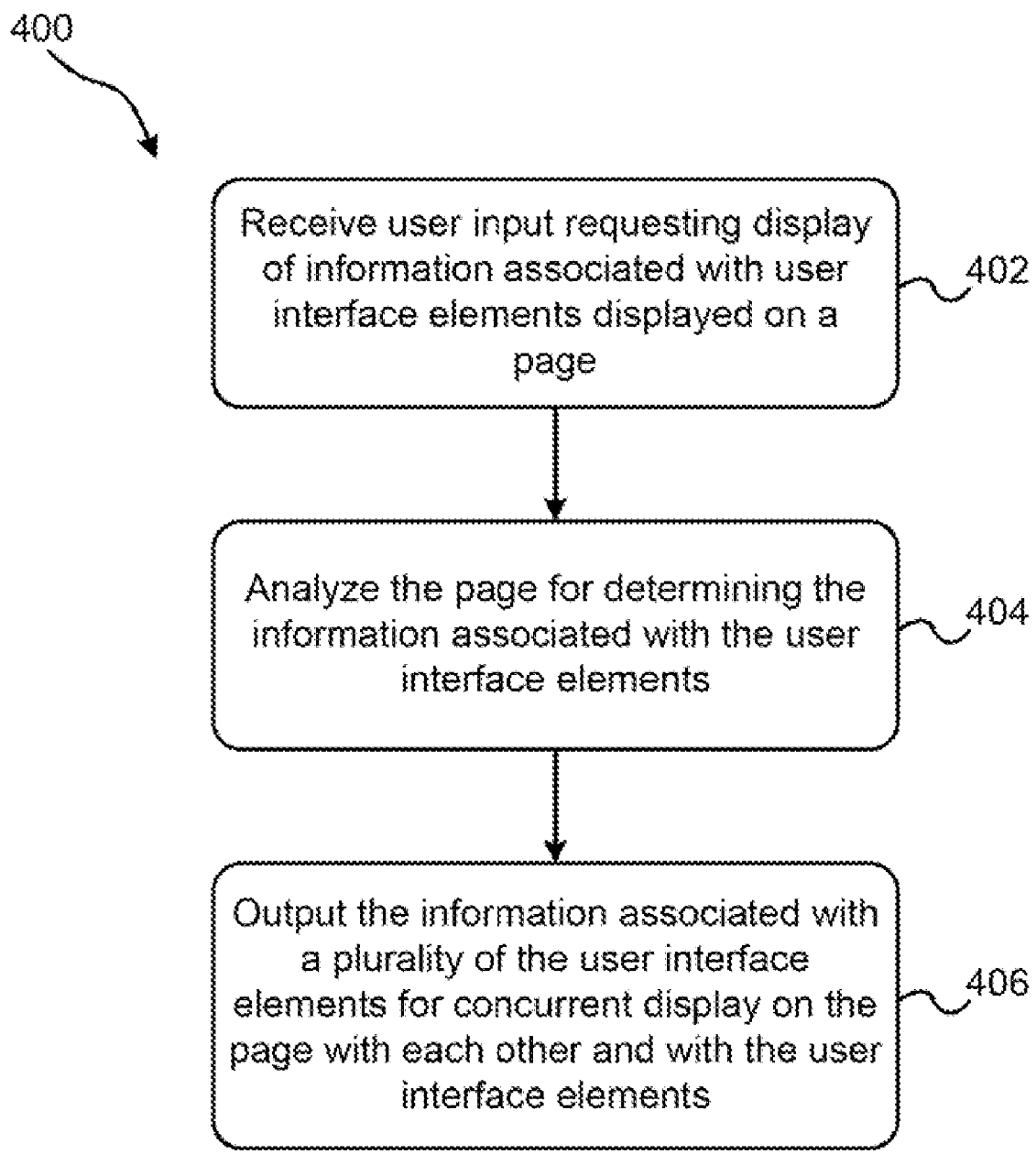
FIG. 4 is a flowchart showing a method according to one embodiment.

Now with reference to FIG. 4, a method 400 may be described according to one embodiment. The method 400 may be used in the context of functionality of a computer system, computer program or application, server, network, etc. In addition, the method 400 may be used in any desired environment, and is not limited by the exemplary environments proposed above.

In operation 402, user input is received requesting display of information associated with user interface elements displayed on a page. User input may come from any user input device, such as a mouse, keyboard, microphone, etc. In addition to user interface elements displayed on a page, the method 400 may be used to display all user interface elements which have additional information which can be displayed. A page may include a web page, an operating system window, a directory listing, a folder display list, etc. Of course, the information associated with the user interface elements may include hover help information.

Figure 8:
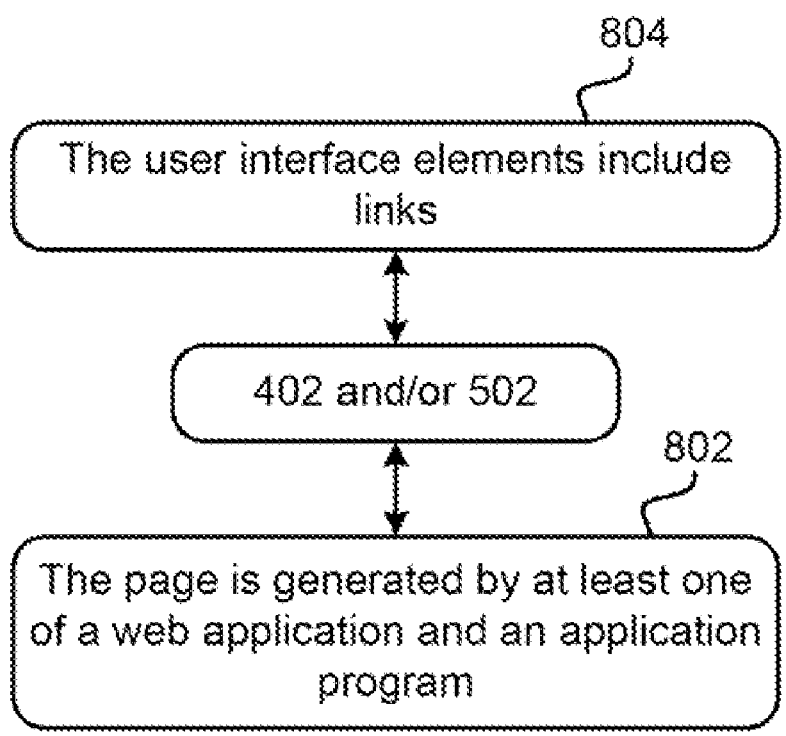
FIG. 8 shows operations that may be used in addition to the methods of FIGS. 4 and 5, according to various embodiments.

In some embodiments, as shown in operation 804 of FIG. 8, user interface elements may include links, text and/or graphics (that are not links), etc.

Referring again to FIG. 4, in operation 404, the page is analyzed for determining the information associated with the user interface elements. For example, a coding of the page may be analyzed to determine the hover help or other text associated with the user interface elements.

In operation 406, the information associated with a plurality of the user interface elements is output for concurrent display on the page with each other and with the user interface elements.

According to some embodiments, only the information associated with the user interface elements that have some functionality may be output. For example, information may be output for each of the links on the page, but not for simple hover help of items that are not links.

In some embodiments, as shown in operation 802 of FIG. 8, the page may be generated by at least one of a web application and an application program.

According to more embodiments, the information associated with the user interface elements may be displayed in an immediate vicinity of the user interface elements associated therewith.

In even more embodiments, the information associated with the user interface elements may be displayed in a list, in a window, in a group of tiles, as thumbnails, etc.

Figure 7:
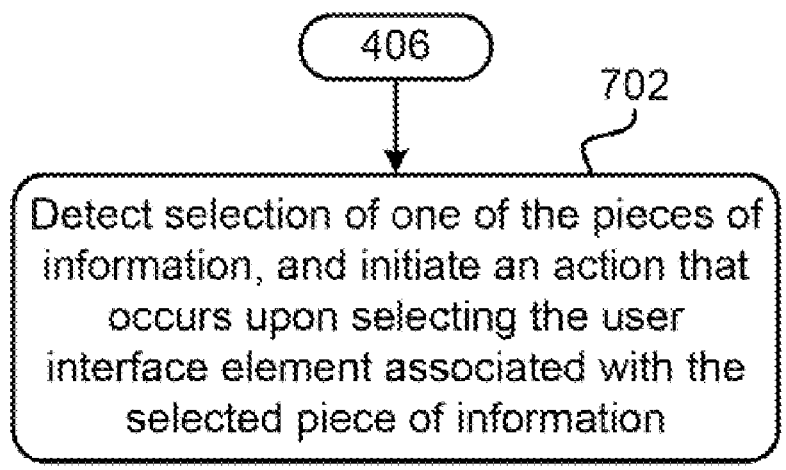
FIG. 7 shows an operation that may be used in addition to the method of FIG. 4, according to one embodiment.

In some approaches, referring again to FIG. 4, the method 400 may further comprise, as shown in operation 702 of FIG. 7, detecting selection of one of the pieces of information, and initiating an action that occurs upon selecting the user interface element associated with the selected piece of information. With reference again to FIG. 4, in some more approaches, the method 400 may further comprise detecting selection or a fly-over of one of the pieces of information, and emphasizing the user interface element associated with the piece of information.

Of course, the method 400 may be used in a system, apparatus, computer program product, etc. In one such embodiment, a computer program product for outputting information associated with a plurality of user interface elements includes a computer usable medium having computer usable program code embodied therewith. The computer usable program code may be configured to receive user input requesting display of information associated with user interface elements displayed on a page. In addition, the computer usable program code may be configured to analyze the page for determining the information associated with the user interface elements and to output the information associated with a plurality of the user interface elements for concurrent display on the page with each other and with the user interface elements.

Figure 5:
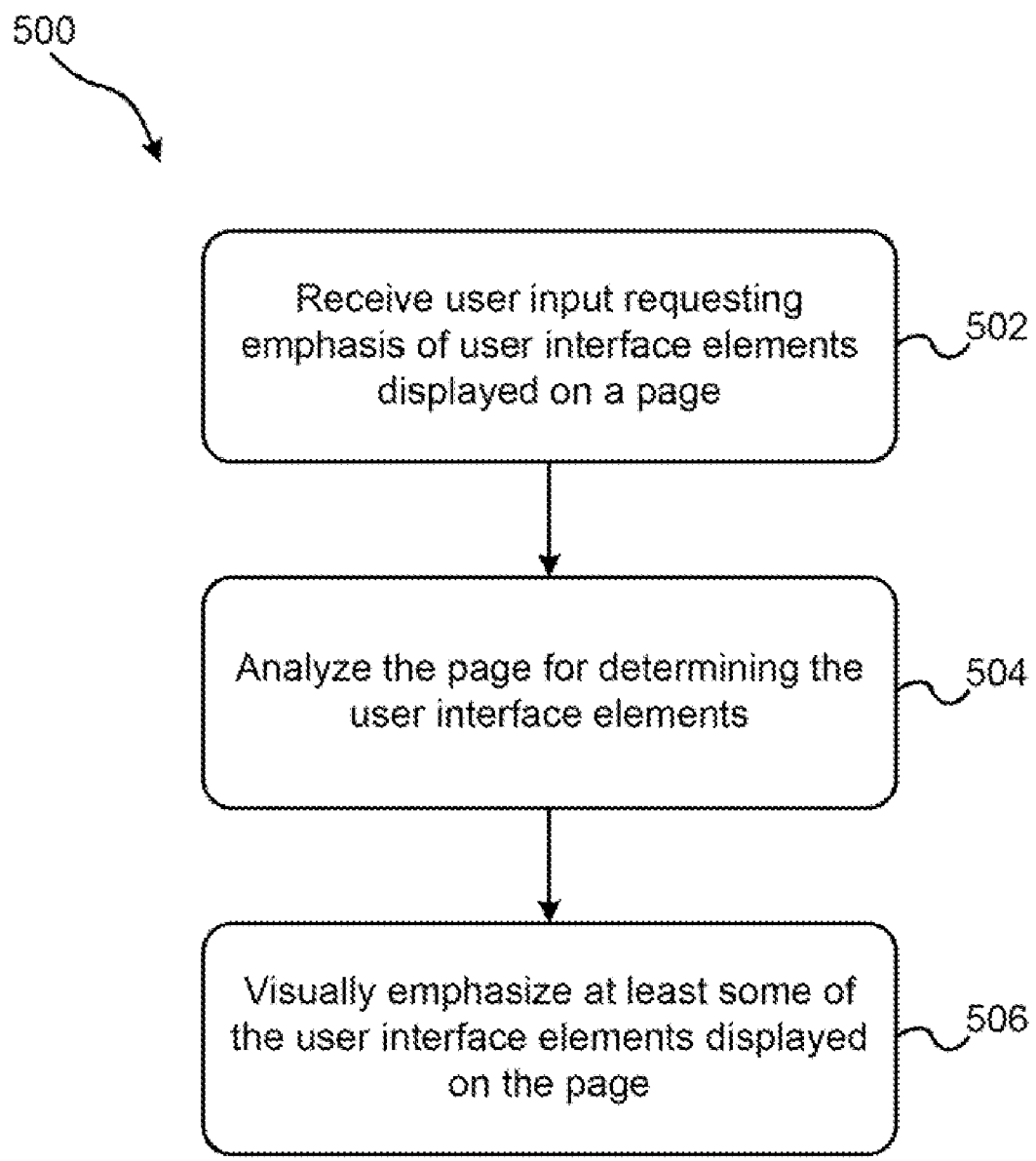
FIG. 5 is a flowchart showing a method according to one embodiment.

Now referring to FIG. 5, another method 500 is shown according to one embodiment. The method 500 may be used in the context of functionality of a computer system, computer program or application, server, network, etc. In addition, the method 500 may be used in any desired environment, and is not limited by the exemplary environments proposed above.

In operation 502, user input is received requesting emphasis of user interface elements displayed on a page. User input may come from any user input device, such as a mouse, keyboard, microphone, etc. In addition to user interface elements displayed on a page, the method 500 may be used to display all user interface elements which have additional information which can be displayed. A page may include a web page, an operating system window, a directory listing, a folder display list, etc. Of course, the information associated with the user interface elements may include hover help information.

In operation 504, the page is analyzed for determining the user interface elements. For example, a coding of the page may be analyzed to determine the user interface elements.

In operation 506, at least some of the user interface elements displayed on the page are visually emphasized.

Figure 6:
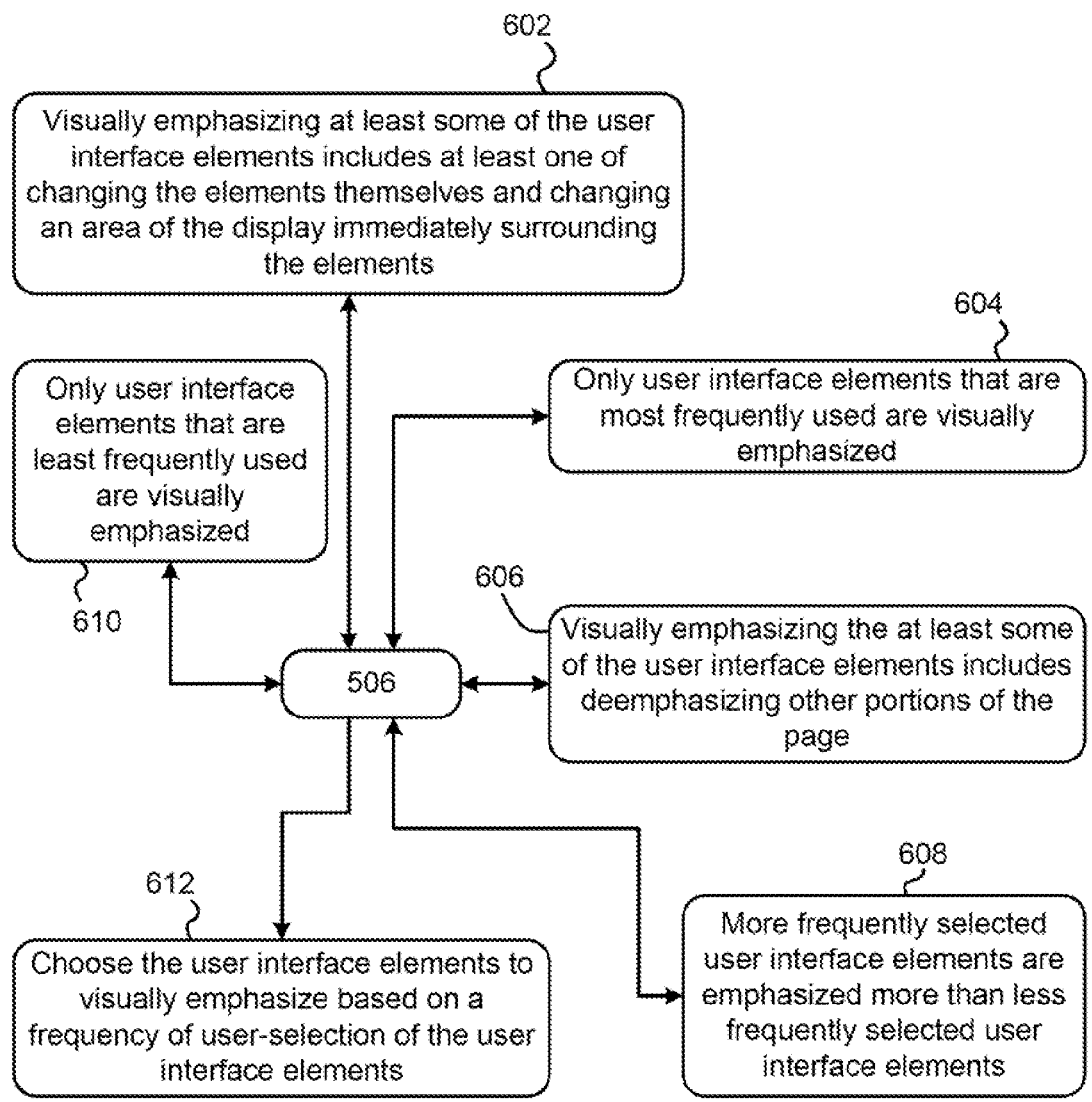
FIG. 6 shows operations that may be used in addition to the method of FIG. 5, according to various embodiments.

According to some approaches, as shown in operation 606 of FIG. 6, visually emphasizing the at least some of the user interface elements may include deemphasizing other portions of the page. For example, other portions of the page can be darkened. Also, the elements themselves, and/or areas immediately surrounding the elements, may or may not be changed. In additional approaches, the user interface elements themselves and areas of the display immediately surrounding the elements may remain unchanged.

In some embodiments, as shown in operation 602, visually emphasizing at least some of the user interface elements may include at least one of changing the elements themselves and changing an area of the display immediately surrounding the elements.

In more embodiments, as shown in FIGS. 5-6, the method 500 may further comprise, as shown in operation 612, choosing the user interface elements to visually emphasize based on a frequency of user-selection of the user interface elements. Also, other user preferences may be used to further refine which user interface elements to visually emphasize or deemphasize, such as non-use, importance, frequency of use with other items and/or processes, etc. In further embodiments, as shown in operation 604, only user interface elements that are most frequently used may be visually emphasized. Conversely, in some embodiments, as shown in operation 610, only user interface elements that are less frequently used may be visually deemphasized.

In some preferred embodiments, as shown in operation 608, more frequently selected user interface elements may be emphasized more than less frequently selected user interface elements.

Of course, the method 500 may be used in a system, apparatus, computer program product, etc. In one such embodiment, a computer program product for outputting information associated with a plurality of user interface elements includes a computer usable medium having computer usable program code embodied therewith. The computer usable program code may be configured to receive user input requesting emphasis of user interface elements displayed on a page. In addition, the computer usable program code may be configured to analyze the page for determining the user interface elements. Also, the computer usable program code may be configured to visually emphasize at least some of the user interface elements displayed on the page.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving user input via a user interface control, requesting display of pieces of hover help information associated with user interface elements displayed on a page where each user interface element includes one of a link, a text, or a graphic;

analyzing the page for determining the pieces of hover help information associated with the user interface elements; and outputting some of the pieces of hover help information associated with a plurality of the user interface elements for concurrent display on the page with each other and with the user interface elements where pieces of hover help information associated with functional, clickable user interface elements are output and pieces of hover help information associated with non-functional, non-clickable user interface elements are not output.

2. A method as recited in claim 1, wherein the page is generated by at least one of a web application and an application program.

3. A method as recited in claim 1, wherein the pieces of hover help information associated with the user interface elements are displayed in an immediate vicinity of the user interface elements associated therewith.

4. A method as recited in claim 1, wherein the pieces of hover help information associated with the user interface elements are displayed in a list.

5. A method as recited in claim 1, further comprising detecting selection of one of the pieces of hover help information, and initiating an action that occurs upon selecting the user interface element associated with the selected piece of hover help information.

6. A method as recited in claim 1, further comprising detecting selection or a fly-over of one of the pieces of hover help information, and emphasizing the user interface element associated with the piece of hover help information.

7. A computer program product for outputting hover help information associated with a plurality of user interface elements, the computer program product comprising:

a non-transitory computer usable medium having computer usable program code embodied therewith, the computer usable program code comprising:

computer usable program code configured to receive user input via a user interface control, requesting display of hover help information associated with user interface elements displayed on a page where each user interface element includes one of a link, a text, or a graphic;

computer usable program code configured to analyze the page for determining the hover help information associated with the user interface elements; and computer usable program code configured to output the hover help information associated, with a plurality of the user interface elements for concurrent display on the page with each other and with the user interface elements, where pieces of hover help information associated with functional, clickable user interface elements are output and pieces of hover help information associated with non-functional, non-clickable user interface elements are not output.

\* \* \* \* \*